(12) United States Patent
Truchsess et al.

(10) Patent No.: US 7,530,582 B2
(45) Date of Patent: May 12, 2009

(54) WHEELED VEHICLE FOR AMUSEMENT PURPOSES

(75) Inventors: Julia D Truchsess, Sandy Hook, CT (US); James Flechner, Sandy Hook, CT (US)

(73) Assignee: Pragmatic Designs Inc., Sandy Hook, CT (US)

( * ) Notice: Subject to any disclaimer, the term of this patent is extended or adjusted under 35 U.S.C. 154(b) by 145 days.

(21) Appl. No.: 11/657,765

(22) Filed: Jan. 25, 2007

(65) Prior Publication Data

US 2007/0176382 A1 Aug. 2, 2007

Related U.S. Application Data

(60) Provisional application No. 60/762,397, filed on Jan. 27, 2006.

(51) Int. Cl.
B62M 1/00 (2006.01)

(52) U.S. Cl. .......... 280/87.021; 280/13; 280/14.28; 280/234; 280/47.11; 280/87.01; 280/771; 280/778; 280/87.043; 280/87.05

(58) Field of Classification Search ........... 280/87.043, 280/87.05, 87.021, 47.11, 87.01, 13, 771, 280/778, 79.2

See application file for complete search history.

(56) References Cited

U.S. PATENT DOCUMENTS

| | | | | |
|---|---|---|---|---|
| 2,464,868 A | * | 3/1949 | Jost | 280/87.01 |
| 2,467,932 A | * | 9/1949 | Foulke | 280/87.01 |
| 3,035,849 A | * | 5/1962 | Groth | 280/87.01 |
| 3,391,947 A | * | 7/1968 | Hodas | 280/87.03 |
| 4,098,519 A | * | 7/1978 | Reid, Jr. | 280/87.01 |
| 4,134,599 A | * | 1/1979 | DiMille et al. | 280/87.01 |
| 4,186,934 A | * | 2/1980 | Collings | 280/221 |
| 5,915,707 A | * | 6/1999 | Steffen | 280/87.03 |
| 6,276,700 B1 | * | 8/2001 | Way et al. | 280/87.01 |
| 6,585,065 B1 | * | 7/2003 | Frejaville | 180/65.1 |
| 6,585,073 B2 | * | 7/2003 | Lorenz | 180/332 |
| 6,604,757 B1 | * | 8/2003 | Huang | 280/778 |
| 6,616,154 B1 | * | 9/2003 | Neuhold | 280/87.05 |
| 6,672,602 B2 | * | 1/2004 | Way et al. | 280/87.01 |
| 6,685,201 B1 | * | 2/2004 | Smith, III | 280/87.01 |
| 6,709,013 B2 | * | 3/2004 | Renfroe et al. | 280/778 |
| 7,073,822 B1 | * | 7/2006 | Renfroe et al. | 280/771 |
| 7,255,194 B2 | * | 8/2007 | Lim et al. | 180/411 |

(Continued)

*Primary Examiner*—Christopher P Ellis
*Assistant Examiner*—Jacob Meyer
(74) *Attorney, Agent, or Firm*—Cohen Pontani Lieberman & Pavane LLP (57) ABSTRACT

A vehicle including a frame; a rider support platform supported by the frame; a pair of first wheel units pivotably supported by the frame; a pair of second wheel units supported by the frame; first and second handlebars pivotably supported by the frame; a first linkage connecting the first handlebar to one of the first wheel units so that pivotable movement of the first handlebar causes wheel of the one of the first wheel units to turn relatively to the frame; a second linkage connecting the second handlebar to the other of the first wheel units so that pivotable movement of the second handlebar causes wheel of the other of the first wheel units to turn relatively to the frame; and a movement coordinator which connects the first and second linkages to each other so that pivotable movement of one or both of the first and second handlebars in one direction causes the wheels of both first wheel units to turn in the same direction.

18 Claims, 8 Drawing Sheets

U.S. PATENT DOCUMENTS

| | | | |
|---|---|---|---|
| 7,416,264 B2* | 8/2008 | Tsukasaki | 303/189 |
| 2001/0028155 A1* | 10/2001 | Way et al. | 280/87.01 |
| 2002/0104706 A1* | 8/2002 | Velke et al. | 180/333 |
| 2002/0135174 A1* | 9/2002 | Renfroe et al. | 280/778 |
| 2003/0211917 A1* | 11/2003 | Cui | 482/51 |
| 2006/0049597 A1* | 3/2006 | Chan et al. | 280/93.504 |

* cited by examiner

WHEELED VEHICLE FOR AMUSEMENT PURPOSES

CROSS-REFERENCE TO RELATED APPLICATION

This application claims the benefit of U.S. Provisional Application No. 60/762,397, filed Jan. 27, 2006.

BACKGROUND OF THE INVENTION

1. Field of the Invention

The present invention relates to small wheeled vehicles, carts, or conveyances used primarily for the amusement of their riders.

2. Description of the Related Art

Throughout history, mankind has enjoyed the sensations associated with locomotion provided at least in part by means other than his own legs and feet. Myriad vehicles and conveyances, both wheeled and non-wheeled, both pragmatic and frivolous, powered by gravity, animal, or mechanical means have been devised and enjoyed by people of all ages.

One of the oldest such devices is the simple sled, consisting of two runners which glide on snow or ice, bridged by a platform on which riders are seated or lie prone. The sled, by virtue of its low position relative to the ground, provides an exhilarating sensation of speed to a prone rider, however, its reliance on the presence of snow or ice is a disadvantage where none is available, limiting its usefulness to certain seasons and/or climates. The sled's steering maneuverability is also typically very limited, and its braking capabilities are virtually nil apart from the riders' dragging body parts on the snow or ground.

Wheeled wagons also have a long history as amusement devices, most well-known being perhaps the "Radio Flyer™" type of child's wagon, consisting of four wheels, the front two of which are steerable by means of a handle on an arm linked to their common axle which has a single pivot at its center, and a platform with raised sides on which a child can sit. This type of wagon suffers limitations in maneuverability due to its primitive steering mechanism and relatively long wheelbase (the distance between front and rear axles). It is also not designed for or conducive to prone riding due to its raised sides, and its platform sits fairly high off the ground. Most wagons furthermore are equipped with solid, narrow tires and are therefore better-suited to low-speed rolling on smooth surfaces as opposed to rough terrain. Most wagons do not provide a means of braking, which can present a safety hazard.

Skateboards are immensely popular and highly maneuverable, but require a great deal of skill to ride and are not particularly conducive the prone riding. They also do not have brakes and typically are not well-suited to rough terrain.

Motorized "go-karts" are also popular and can offer great speed, but are relatively complex and expensive, large and heavy, and do not offer a prone riding position. In particular, the braking systems used in motorized go-karts are a source of complexity and expense. The most common systems, in descending order of sophistication, are disc, drum, band, and "scrub" brakes. Of these, only the first two are suitable for front-wheel braking due to the pivoting steering mechanisms of the front wheels, and even these require flexible cables and other elaborate design elements to achieve front wheel braking. Far more common in go-karts, especially less costly ones, is rear-wheel braking, which due to forward weight transfer during deceleration, is less effective than front-wheel braking. Furthermore, rear-wheel braking systems typically require one or more mechanical linkages running from the forward-located operator controls back to the rear wheels, which is problematic if easy folding or collapsing of a vehicle for compact storage or transport is contemplated.

Go-karts typically are not designed for ride height adjustment; they are either designed for low ground clearance for smooth racetrack use, or for high ground clearance for rougher terrain. The steering mechanisms typically used on such vehicles do not lend themselves to easy ride height adjustment because their steering linkages are attached to components whose positions change with ride height.

SUMMARY OF THE INVENTION

It is an object of this invention to provide a conveyance capable of carrying children or adult riders, and of creating an exhilarating sensation of speed for its rider(s).

It is a further object of the invention to provide such a means of conveyance which is easy to operate.

It is a further object of the invention to provide such a means of conveyance providing a great degree of maneuverability and a small turning radius.

It is a further object of the invention to provide such a means of conveyance allowing its rider(s) to lie in a prone position during its operation.

It is a further object of the invention to provide such a means of conveyance that places its rider(s) in close proximity to the ground.

It is a further object of the invention to provide such a means of conveyance that incorporates a simple, inexpensive, front-wheel braking system.

It is a further object of the invention to provide such a means of conveyance that is relatively small and which can collapse or fold further to facilitate storage and transportation, such that when folded it occupies less than twelve cubic feet of space.

It is a further object of the invention to provide such a means of conveyance that employs pneumatic tires of such size and composition as to provide an acceptable ride on both smooth pavement and rough terrain.

It is a further object of the invention to provide such a means of conveyance that allows users to adjust its ride height quickly and easily, with no or minimal need for tools.

To achieve these and other objects, the present application discloses a vehicle including a structural frame; a rider support platform supported by the structural frame; a pair of first wheel units pivotably supported by the structural frame, each first wheel unit comprising a first wheel; a pair of second wheel units supported by the structural frame, each second wheel unit comprising a second wheel; a first handlebar pivotably supported by the structural frame so that the first handlebar is pivotable relatively to the structural frame in opposite first and second directions; a second handlebar pivotably supported by the structural frame so that the second handlebar is also pivotable relatively to the structural frame in the first and second directions; a first linkage connecting the first handlebar to one of the first wheel units so that pivotable movement of the first handlebar causes the first wheel of the one of the first wheel units to turn relatively to the structural frame; a second linkage connecting the second handlebar to the other of the first wheel units so that pivotable movement of the second handlebar causes the first wheel of the other of the first wheel units to turn relatively to the structural frame; and a movement coordinator which connects the first and second linkages to each other so that pivotable movement of one or both of the first and second handlebars in the first or second direction causes the first wheels to turn in same direction.

These and other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
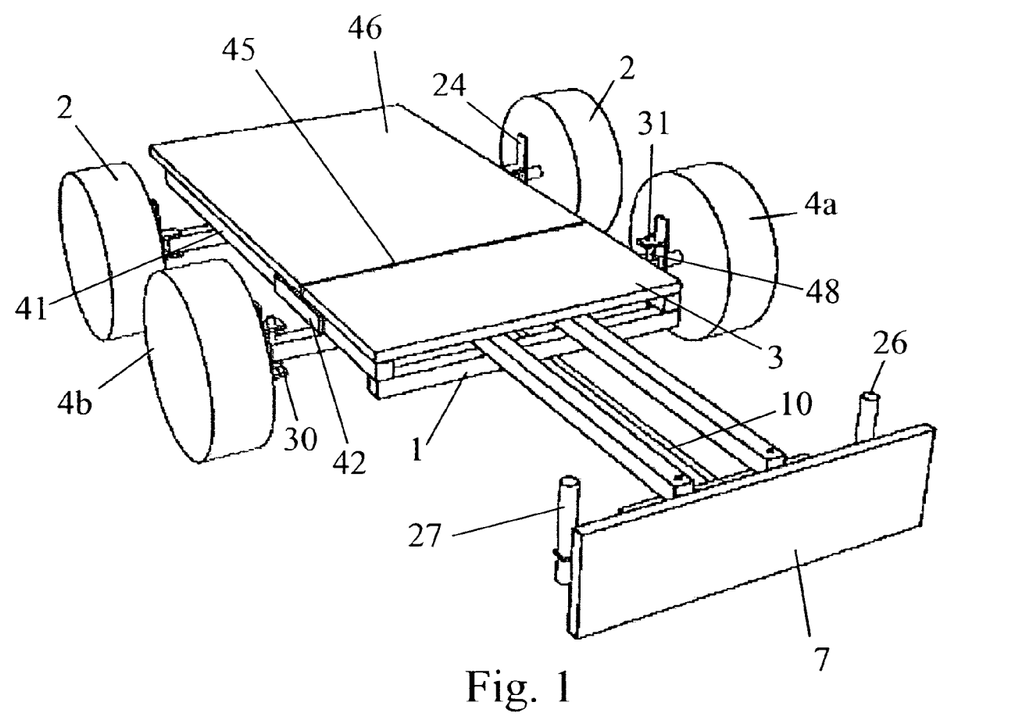
FIG. 1 is a partially cutaway perspective view showing one embodiment of the invention from above and in front. The forward portion of the front rider support platform is not shown in order to reveal elements of the steering mechanism.
Figure 3:
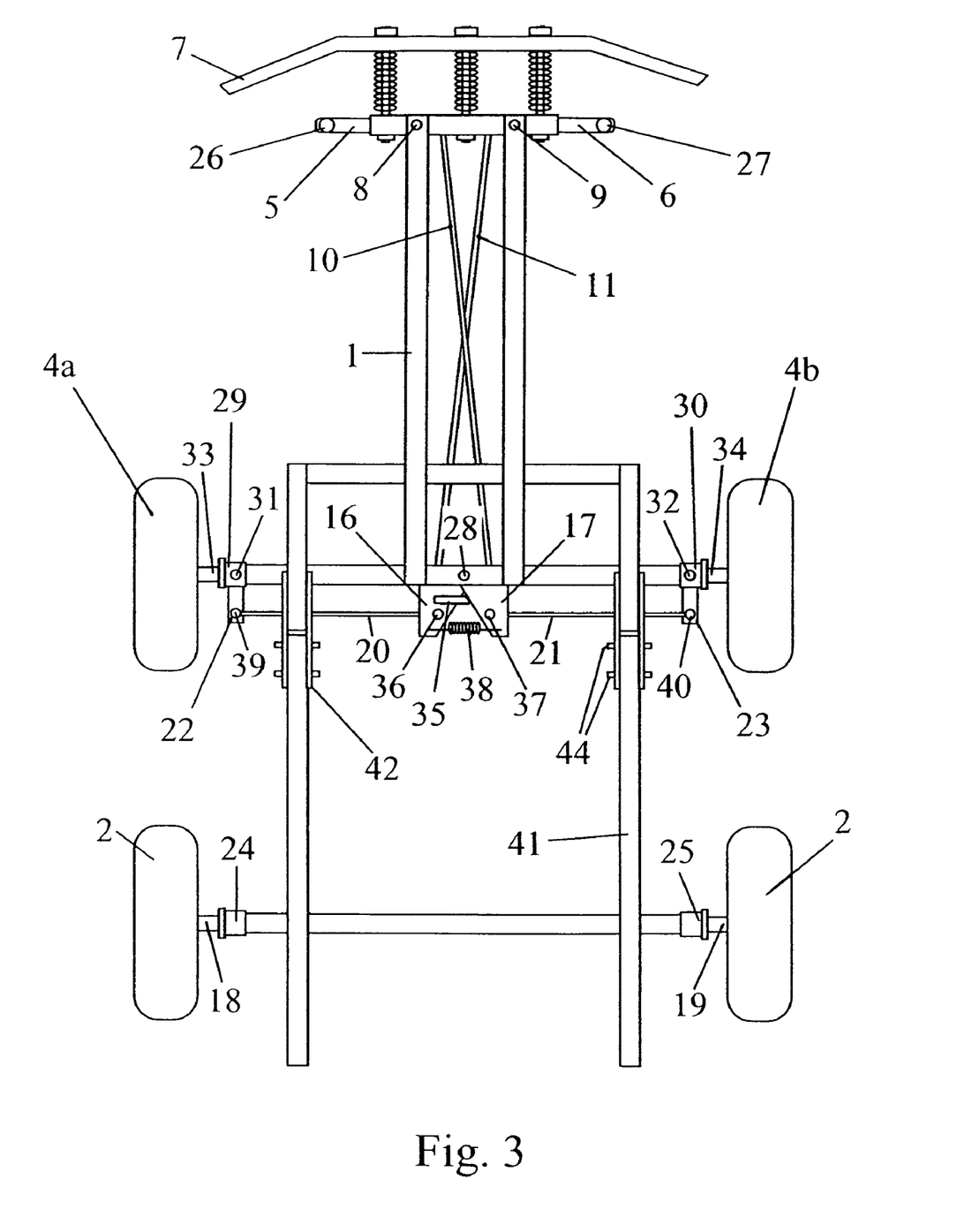
FIG. 3 is a cutaway overhead plan view of the embodiment of the invention with both front and rear rider support platforms hidden to reveal its structure and mechanisms.
Figure 4:
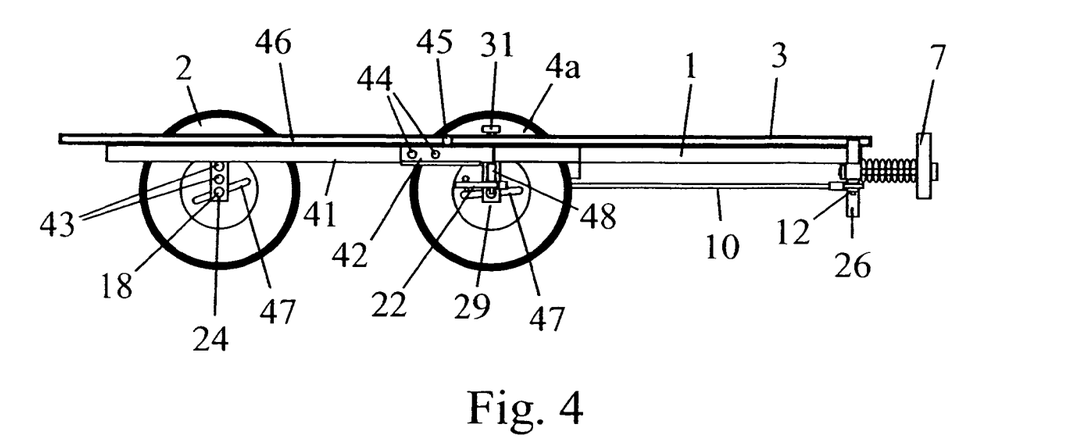
FIG. 4 is a cutaway side elevation view from the right side of the embodiment of the invention, with its right-side wheels, right-side steering components, and left-side wheel centers hidden for clarity.

A preferred embodiment of the invention is comprised primarily of a structural frame, wheels, rider support platforms, a steering mechanism, and a braking mechanism. Some of the principal components of the preferred embodiment are shown in FIG. 1. With reference to FIGS. 1, 3, and 4, front rider support platform 3 is fixedly attached to front structural frame assembly 1, which is attached to rear structural frame assembly 41 via frame support brackets 42. Rear rider support platform 46 is fixedly attached to rear structural frame assembly 41 and, via rider support platform hinge 45, to front rider support platform 3. Kingpins 31 and 32 are mounted to front structural frame assembly 1, and spindle brackets 29 and 30 are supported pivotably on said kingpins by spacers 48. Front wheels 4a and 4b, comprising pneumatic tires, hubs, and bearings, are spinnable on threaded axles 33 and 34, which are attached to spindle brackets 29 and 30. Rear wheels 2, comprising pneumatic tires, hubs, and bearings, are spinnable on threaded axles 18 and 19, which are attached to rear axle mounting brackets 24 and 25, which are fixedly attached to rear structural frame assembly 41. Left handlebar 5 and right handlebar 6 are attached to the forward end of structural front frame assembly 1 via handlebar pivots 8 and 9, behind bumper assembly 7.

Figure 2:
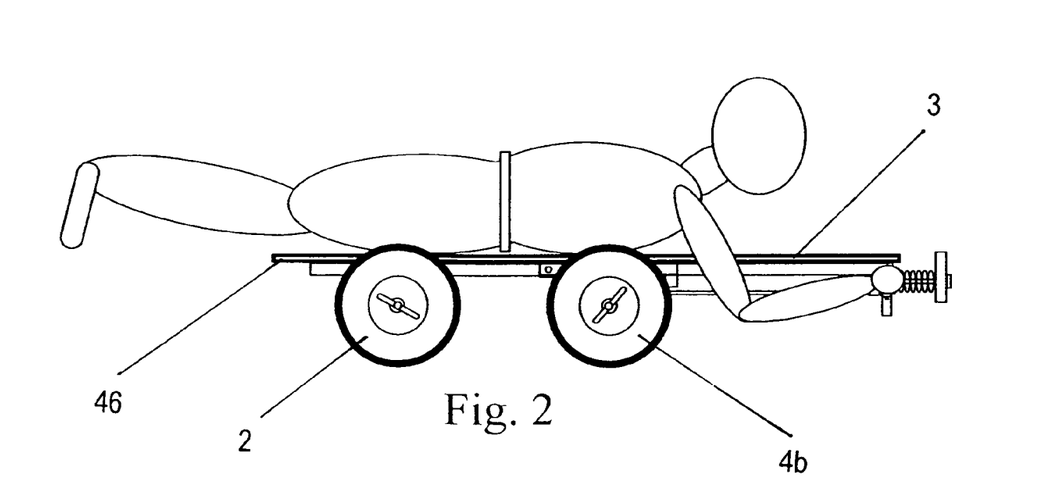
FIG. 2 is a side view of the invention and rider, illustrating the preferred riding position.

FIG. 2 depicts a rider in a preferred riding position on the invention.

Figure 5:
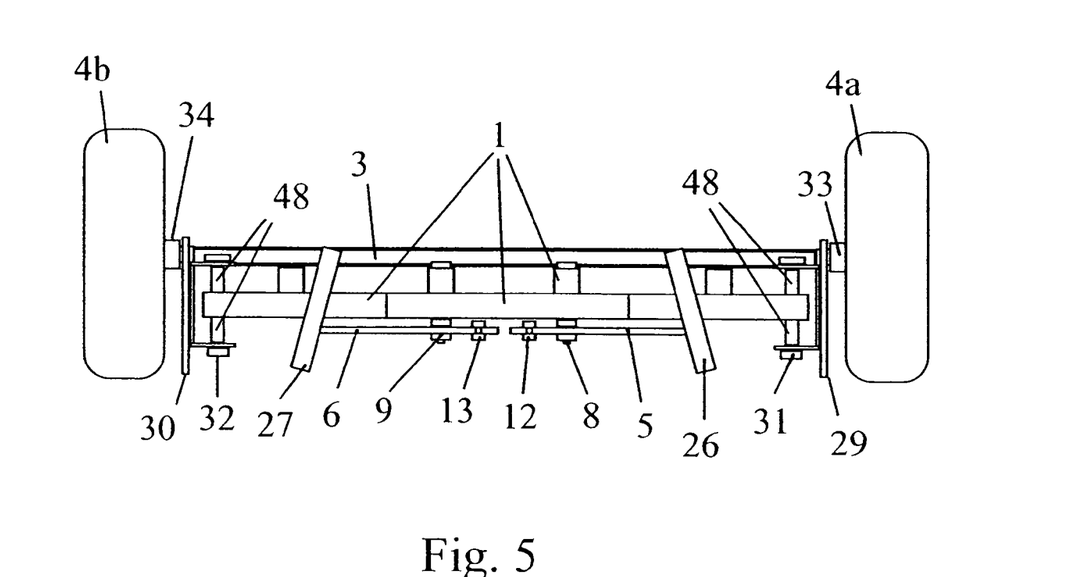
FIG. 5 is a cutaway frontal elevation view with the invention's bumper components hidden to reveal its steering controls.
Figure 7:
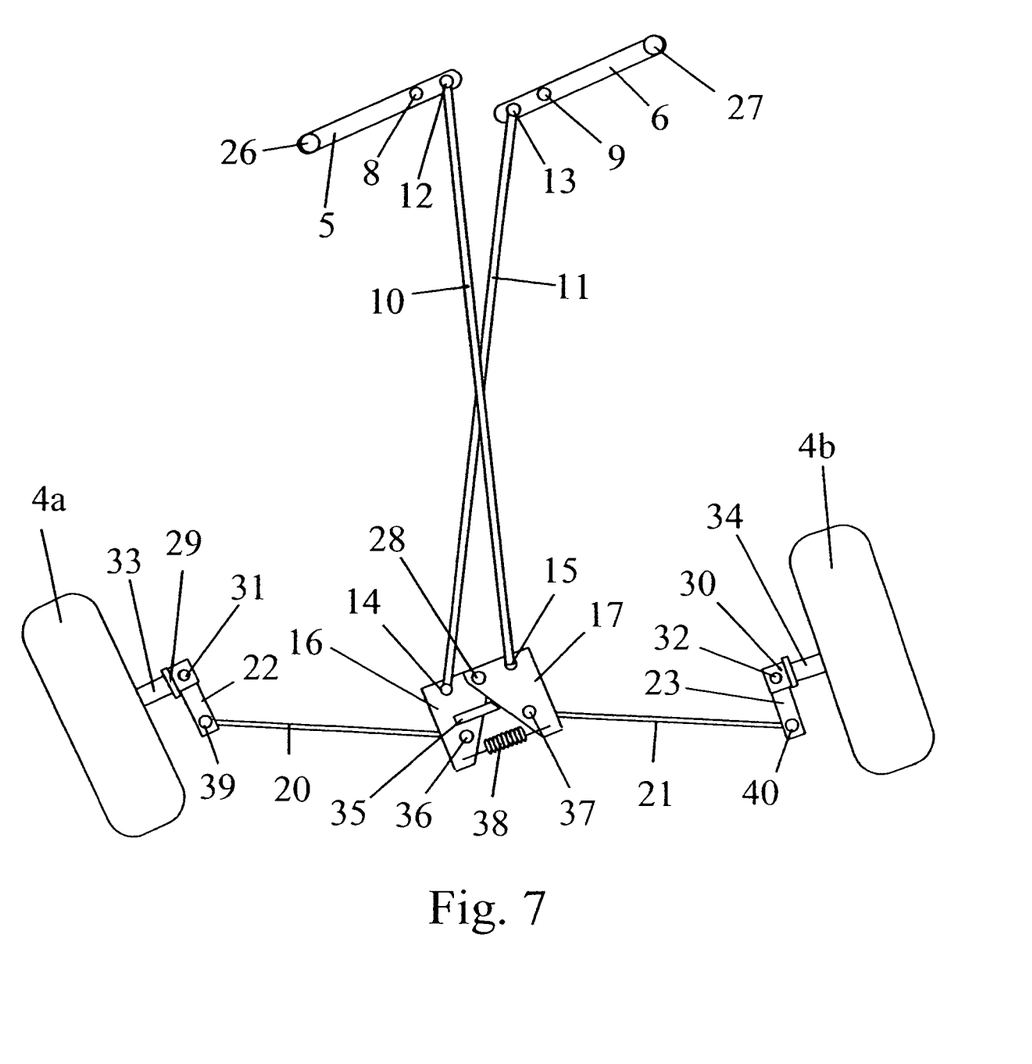
FIG. 7 is a cutaway partial overhead plan view of the steering linkages in a left-turning position. Only steering mechanism components and front wheels are shown in this view.

Referring to FIGS. 3, 4, and 5, left and right handlebars 5 and 6 are pivotable about left and right handlebar pivots 8 and 9. The interior ends of the handlebars 5,6 are attached to left and right steering linkage rods 10 and 11 at forward steering linkage pivots 12 and 13. As shown in FIG. 7, steering linkage rods 10, 11 are attached at their rearmost ends to rear steering linkage pivots 14 and 15 on left and right steering pivot arms 16 and 17, which are attached pivotably to the front frame assembly 1 at steering pivot 28 such that they can rotate freely in planes parallel to that of the frame. Steering pivot arms 16 and 17 are attached by means of tie rod inner pivots 36 and 37 to left and right tie rods 20 and 21, which are in turn connected at their outer ends to steering arms 22 and 23 by means of tie rod outer pivots 39 and 40. It can thus be seen that when handlebars 5 and 6 are moved forward or backward by the operator's movement of handgrips 26 and 27, their motion is transmitted via the various linkages, pivots, and tie rods to effect lateral movement of the rearward ends of steering arms 22 and 23, which steering arms 22, 23 are rigidly attached to spindle brackets 29 and 30, effecting rotation of the spindle brackets around kingpins 31 and 32, which effects turning of front wheels 4a and 4b which are attached to the spindle brackets via axles 33 and 34.

Figure 6:
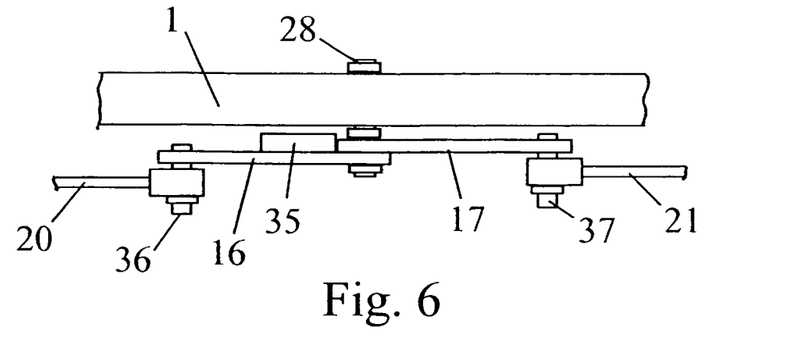
FIG. 6 is an enlarged detail cutaway partial front elevation view of the embodiment of the invention to show steering pivots and tie rods in a straight, non-turning position.

FIG. 6, a simplified partial rear cutaway view of the steering pivot arms and tie rods, illustrates in greater detail the manner in which the steering pivot arms 16 and 17 are mounted on and rotate about steering pivot 28, which is attached to front frame assembly 1. Steering pivot arm stop 35 is rigidly attached to left steering pivot arm 16 in roughly the same plane as right steering pivot arm 17 such that it limits the inward motion of the rearward sections of the two pivot arms toward each other, as can be seen with further reference to FIG. 3. Limiting the inward motion of the rearward sections of the two steering pivot arms 16, 17 toward each other in turn limits the relative outward motion of left and right wheels 4a and 4b with respect to each other, a parameter commonly referred to as "toe out" in automotive terminology. In practice, steering pivot arm stop 35 is positioned such that when steering pivot arm stop 35 is against the inward-facing edge of right steering pivot arm 17, the front edges of front wheels 4a and 4b will be angled slightly inwards toward each other, a position known as "toe in" in automotive terminology, known to yield optimal steering stability when the intended path of a vehicle is straight ahead.

Referring to FIG. 3, it will be noted that tie rod inner pivots 36 and 37 of tie rods 20 and 21 are offset outwards laterally from steering pivot 28. This configuration yields what is commonly known in automotive terminology as "Ackermann steering geometry" and causes front wheels 4a and 4b to pivot in a such a manner that during turns, lines drawn rearward through their axes will intersect (as opposed to remaining parallel), ensuring that both wheels will tend to roll rather than skid during turns, which reduces turning radius and improves maneuverability, rolling efficiency and steering stability. It may also be noted that the preferred embodiment of the present invention features an extremely short wheelbase relative to its wheel track, i.e. the distance between its front and rear axles is virtually the same as the distance between its left and right wheel centers. It will be apparent to those skilled in vehicle design that in conjunction with Ackermann steering geometry, these proportions will provide a small turning radius and a high degree of maneuverability.

FIG. 7 illustrates the means by which the front wheels 4a and 4b are turned in unison to effect left steering of the preferred embodiment of the invention. As previously described, rearward movement of left handgrip 26 effects, via the various linkages previously described, a rightward movement of tie rod inner pivot 37 of right steering pivot arm 17, which in turn effects a left-turn movement of right front wheel 4b. It can be seen furthermore, that by means of the inward force exerted by movement coordinator such as expansion spring 38, attached at one of its ends to right steering pivot arm 17 and at the other to left steering pivot arm 16, the rightward motion right steering pivot arm 17 will exert a rightward force on left steering pivot arm 16, effecting a left-turn movement of left wheel 4a. Similarly, it can be seen that rearward motion of right handgrip 27, which causes leftward movement of tie rod inner pivot 36 of left steering pivot arm 16 effecting a right-turn movement of left front wheel 4a, will also, by means of expansion spring 38, cause leftward movement of tie rod inner pivot 37 of right steering pivot arm 17, effecting a right-turn movement of right front wheel 4b. Thus, by virtue of the inward force of expansion spring 38, limited by steering pivot arm stop 35, the two steering pivot arms 16 and 17 are made to act in concert to turn both wheels when one or the other of handgrips 26, 27 is pulled rearward by the operator. Similarly, it can be seen that forward pressure on one of the two handgrips 26, 27 will cause rotation of its associated steering pivot arm 17 or 16, respectively, and by virtue of steering pivot arm stop 35 impinging on the other steering pivot arm, effect a corresponding motion in its companion steering pivot arm 16 or 17, turning both front wheels 4a and 4b in concert. In normal, non-braking operation, the preferred embodiment of the invention is intended to be steered by the operator moving one handle forward and the other rearward in a manner not unlike that of steering the single handlebar of a bicycle or sled. Under these conditions the forces exerted by expansion spring 38 and steering pivot arm stop 35 effectively link the two steering pivot arms 16 and 17 as one unit, causing the front wheels 4a and 4b to turn left or right together, as is common with most vehicles. The reasons for separating the steering pivot arm into two separate units capable of independent motion will be become apparent in subsequent parts of the description of the invention.

Figure 8:
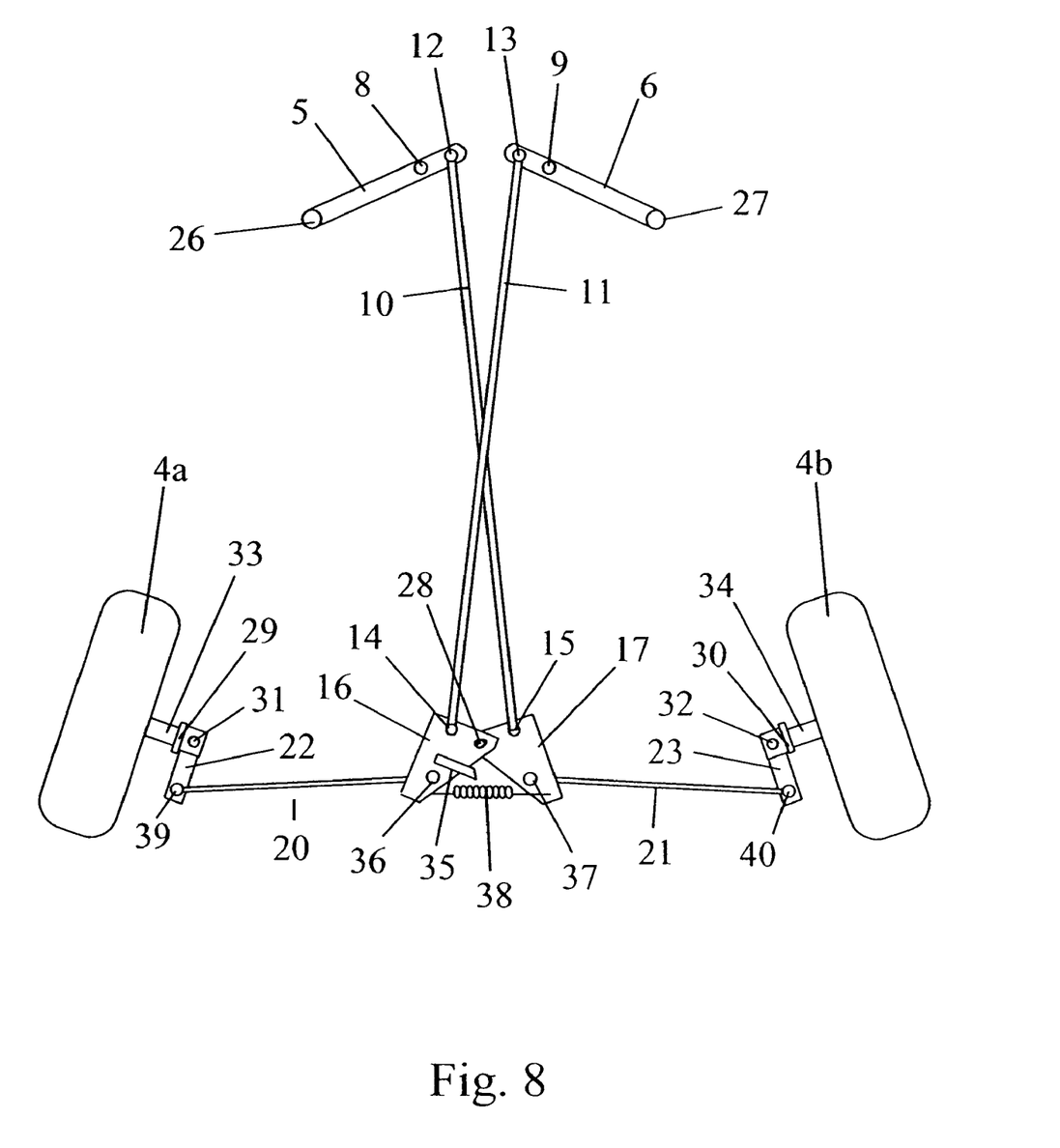
FIG. 8 is a cutaway partial overhead plan view of the embodiment of the invention to show the steering linkages in their braking position. Only steering mechanism components and front wheels are shown in this view.

FIG. 8 shows the front wheels 4a and 4b in their braking configuration. Braking is achieved by causing both wheels to turn their front edges inward, in a severe "toe-in" position analogous to the "snowplowing" technique used by snow skiers to stop their forward momentum. The braking position of the wheels is effected by the operator pulling both handgrips 26 and 27 rearward, which, as explained previously, causes, by means of the various linkages and pivots, both front wheels 4a and 4b to turn inwards. In normal operation this non-parallel motion of front wheels 4a and 4b would be resisted by the inward force exerted by expansion spring 38 on steering pivot arms 16 and 17, but by application of more rearward force than is normally used for steering upon both handgrips 26 and 27, the force of spring 38 can be overcome by the operator and both wheels caused to turn inwards in the "toe-in" braking position. While highly unconventional in wheeled vehicle design, the braking scheme described here offers advantages in cost and simplicity over other common braking systems, as well as offering further advantages in allowing the preferred embodiment of the invention to be easily folded for storage and transport as will be described subsequently. Additionally, unlike rear-wheel braking schemes, the front-wheel braking mechanism described here offers the benefit of enhanced braking force exerted by the vehicle tires on the road surface due to forward weight transfer during deceleration.

It may be noted that should it be desired that braking be effected by pushing both handgrips forward rather than by pulling them backwards, a simple rearrangement of the steering elements of the preferred embodiment of the present invention can achieve this result, to wit: reversal of the relative positions of pivots 8 and 12 on handlebar 5 and that of pivots 9 and 13 on handlebar 6, in conjunction with connection of left steering linkage 10 to rear steering linkage pivot 14 rather than to rear steering linkage pivot 15, and connection of right steering linkage 11 to rear steering linkage pivot 15 rather than to rear steering linkage pivot 14.

Figure 9:
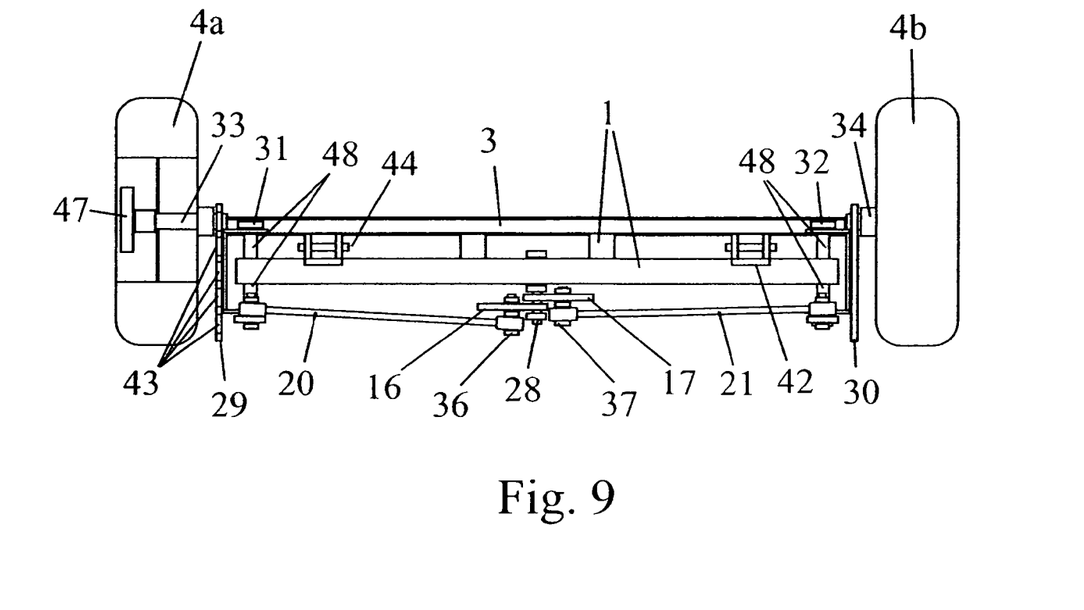
FIG. 9 is a cutaway rear elevation view of the embodiment of the invention with the rear wheels and rear frame assembly hidden, showing the front wheels set in the "low ride height" position.
Figure 10:
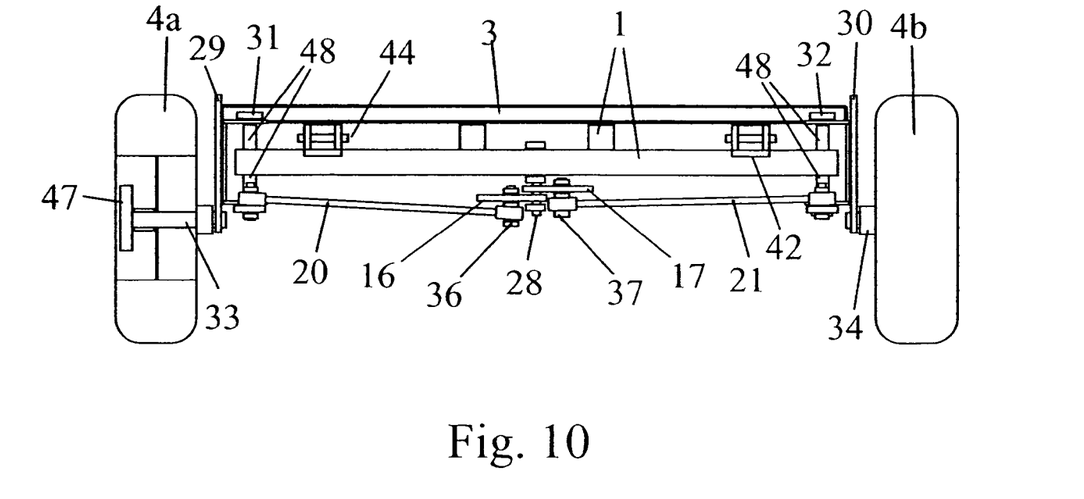
FIG. 10 is a cutaway rear elevation view of the embodiment of the invention, with the rear wheels and rear frame assembly hidden, showing the front wheels set in the "high ride height" position.

FIGS. 4, 9, and 10 illustrate the means by which the ride height of the invention can be easily and quickly adjusted by the user. Height adjustment of all four wheels of the invention is accomplished by the same means. Referring to FIGS. 9 and 10, in particular the front left wheel 4a which is shown in cutaway, wheel 4a, with its integral hub and bearings, is attached by means of threaded axle 33 to threaded holes 43 in spindle bracket 29. A plurality of such threaded holes is provided along the outward-facing vertical sides of spindle bracket 29, at varying heights. By means of handle 47, attached to threaded axle 33, the threaded axle 33 can be easily and without tools unscrewed by hand from one hole position and screwed into another by the user, changing the ride height as illustrated. It may be noted that the design of the preferred embodiment of the present invention, in contrast to that of most vehicles of its type, allows simple ride height adjustment of its front wheels without disturbing any of its steering linkages. FIG. 4 depicts the elements of the adjustable height feature with respect to the left-rear wheel of the preferred embodiment of the invention, from a side elevation view.

Figure 11:
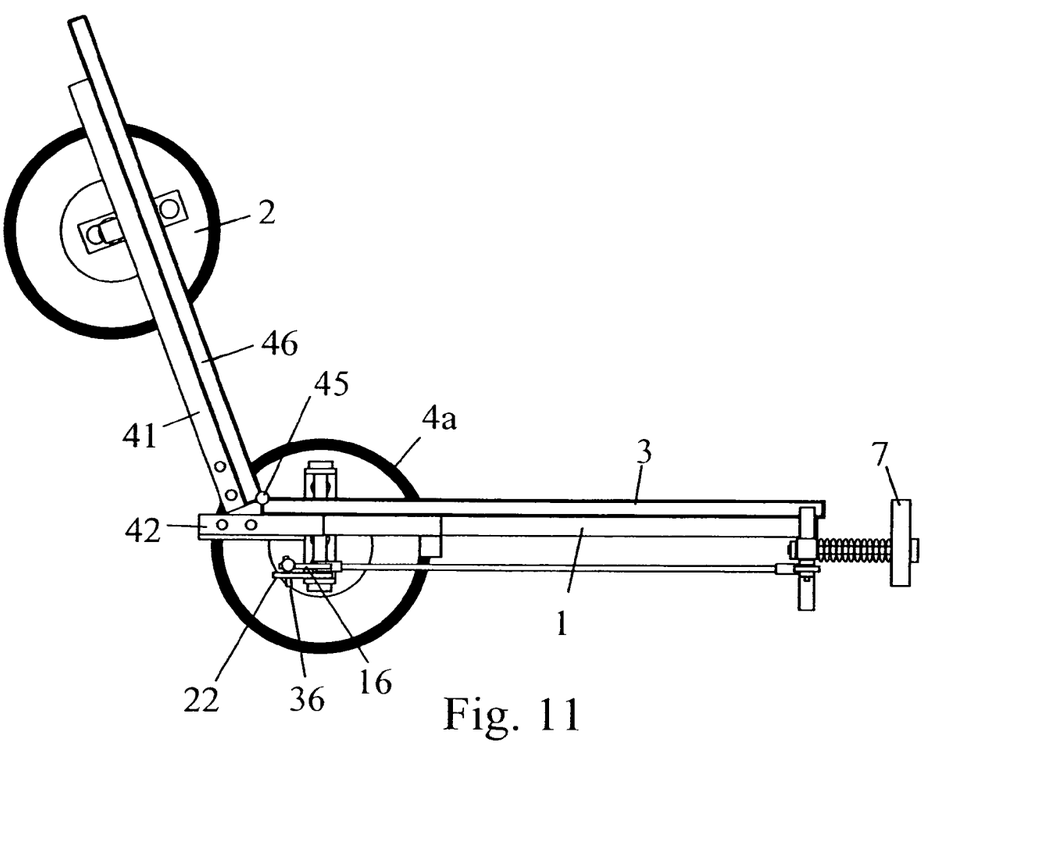
FIG. 11 is a cutaway side elevation view showing the embodiment of the invention in a semi-folded position.
Figure 12:
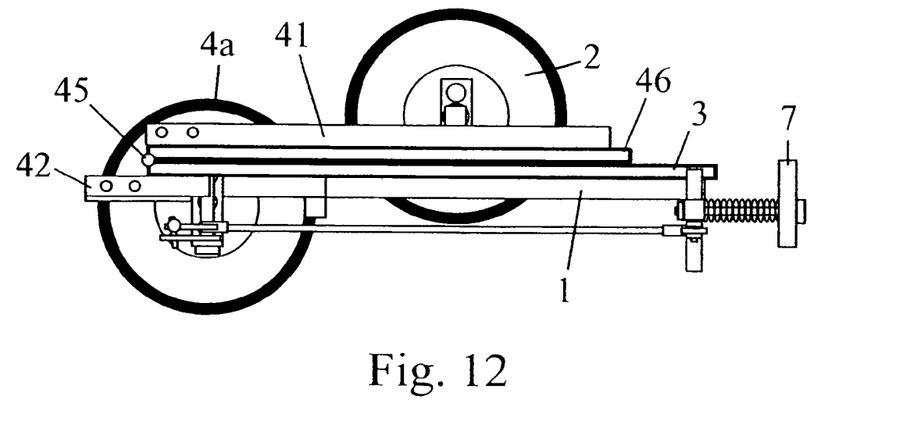
FIG. 12 is a cutaway side elevation view showing the embodiment of the invention in its fully-folded position.
Figure 13:
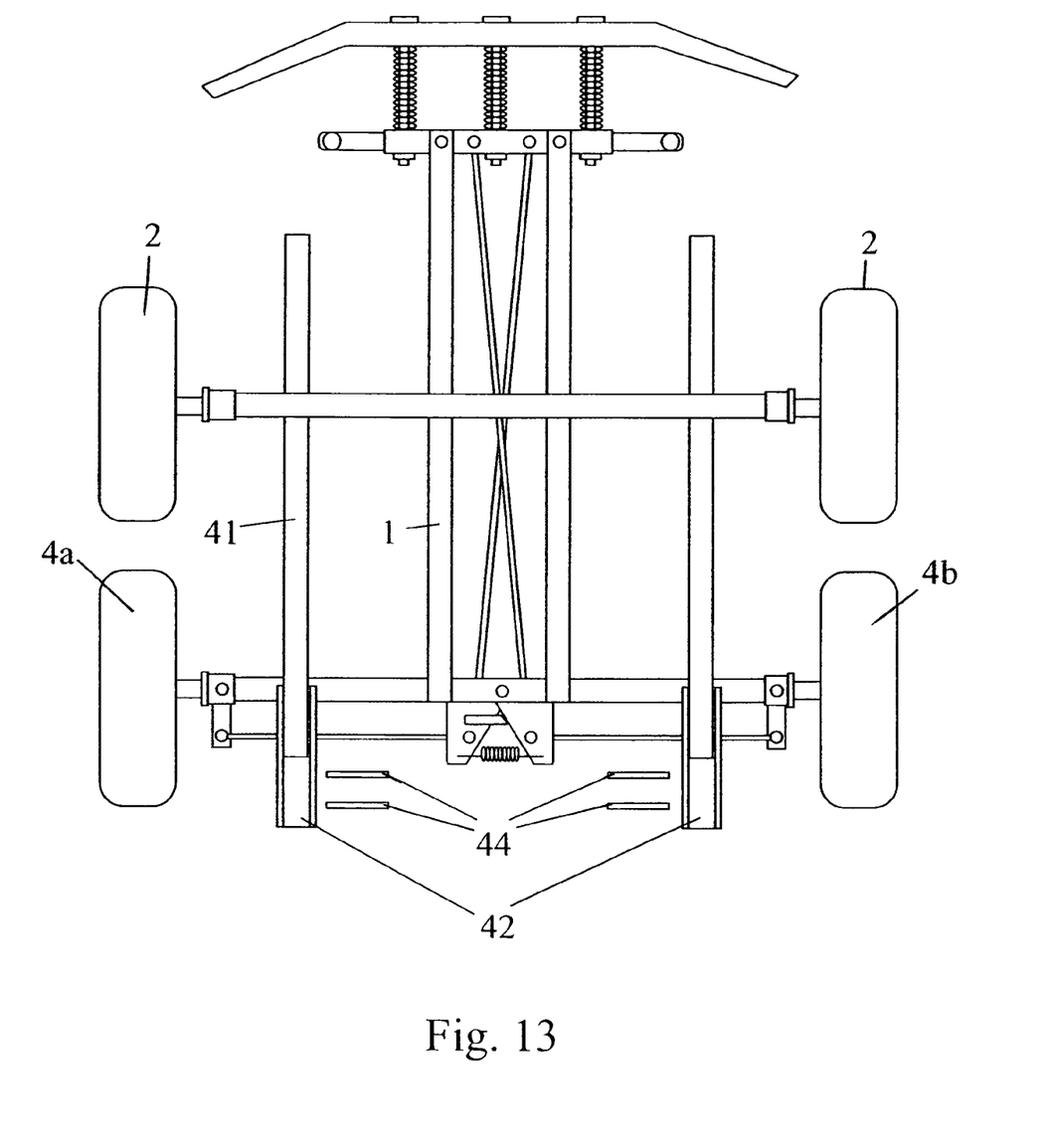
FIG. 13 is a cutaway overhead plan view showing the embodiment of the invention in its fully-folded position. The front and rear rider support platforms are hidden in order to reveal structural details.

FIGS. 3, 9, 11, 12, and 13 illustrate how the preferred embodiment of the invention easily folds for compact transportation or storage. Frame support brackets 42, which can be seen in cross section in FIG. 9, in side elevation view in FIG. 4, and in overhead plan view in FIGS. 3 and 13, are fixedly attached to front structural frame assembly 1 and form "U" shaped channels whose rear portions project past the ends of front structural frame assembly 1. Referring to FIGS. 3 and 4, rear structural frame assembly 41 can be seen to engage within the projecting "U" channels of frame support brackets 42, and is held rigidly there by means of frame lock pins 44 inserted through holes in the sides of frame support brackets 42 and in the sides of rear structural frame assembly 41. In the preferred embodiment of the invention, frame lock pins 44 are of the "quick-release" type commonly known as "ball-lock pins" or "detent pins", but could also be bolts or similar fasteners. It can thus be seen that rear structural frame assembly 41 and front structural frame assembly 1 are joined as one structural element when rear structural frame assembly 41 is engaged in frame support brackets 42 and frame lock pins 44 are inserted, and furthermore that rear structural frame assembly 41 and front structural frame assembly 1 can be disengaged from each other by removing frame lock pins 44.

FIG. 11 depicts the preferred embodiment of the invention in a partially-folded position from a side cutaway view. Front rider support platform 3 and rear rider support platform 46 are joined together pivotably by rider support platform hinge 45, which is seen in side elevation view in FIGS. 11 and 12 and in perspective view in FIG. 1. Rear structural frame assembly 41, shown in FIGS. 11 and 12 disengaged from frame support brackets 42, is fixedly attached to rear rider support platform 46 and therefore pivots on rider support platform hinge 45 together with rear rider support platform 46. Front structural frame assembly 1 is similarly fixedly attached to front rider support platform 3 and thereby indirectly to rider support platform hinge 45. FIG. 12 illustrates the preferred embodiment of the invention in its fully-folded state, seen from a cutaway side elevation view. In this state, rear rider support platform 46 and rear structural frame assembly 41 are "upside down", the normally "upper" surface of rear rider support platform 46 is in contact with the upper surface of front rider support platform 3, and rear wheels 2 are "in front of" front wheels 4a and 4b. FIG. 13 illustrates the fully-folded state of the preferred embodiment of the invention from an overhead plan cutaway view, with the rider support platforms 3 and 46 omitted for clarity. It can thus be seen how the folding mechanism described allows the preferred embodiment of the present invention to be quickly and easily folded into a compact form for storage or transportation. It may also be noted that the previously-described front-wheel braking system of the preferred embodiment of the present invention facilitates the invention's folding feature by virtue of its freedom from linkages between the front and rear sections.

Thus the reader will see that the present invention provides a novel and entertaining conveyance featuring a high degree of steering maneuverability, a prone riding position which is close to the ground, a simple and inexpensive front-wheel braking system, easy adjustment of ride height with no or minimal tools, foldability into a volume of less than twelve cubic feet for compact storage and transportation, and relative simplicity and low cost for the performance achieved.

While the above description contains many specificities, these should not be construed as limitations on the scope of the invention, but rather as an exemplification of one preferred embodiment thereof. For example, a seated riding position could be offered by providing a seat and means for operating the steering and braking controls with the rider's feet, or by providing means for extending the steering and braking controls to within reach of the rider's hands. As another example, a more conventional braking system such as disc or drum brakes could be added to the invention should more sophisticated braking be desired at the expense of cost and complexity.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vehicle comprising:
   a structural frame;
   a rider support platform supported by the structural frame;
   a pair of first wheel units pivotably supported by the structural frame, each first wheel unit comprising a first wheel;
   a pair of second wheel units supported by the structural frame, each second wheel unit comprising a second wheel;
   a first handlebar pivotably supported by the structural frame so that the first handlebar is pivotable relatively to the structural frame in opposite first and second directions;
   a second handlebar pivotably supported by the structural frame so that the second handlebar is also pivotable relatively to the structural frame in the first and second directions;
   a first linkage connecting the first handlebar to one of the first wheel units so that pivotable movement of the first handlebar causes the first wheel of the one of the first wheel units to turn relatively to the structural frame;
   a second linkage connecting the second handlebar to the other of the first wheel units so that pivotable movement of the second handlebar causes the first wheel of the other of the first wheel units to turn relatively to the structural frame; and
   a movement coordinator which connects the first and second linkages to each other so that pivotable movement of one or both of the first and second handlebars in the first or second direction causes the first wheels to turn in the same directions,
   wherein pivotable movement of the first and the second handlebar in opposite directions causes each of the wheels in the pair of first wheel units to point in opposite directions in a toe-in configuration causing a braking action in a relatively straight line.

2. The vehicle of claim 1, wherein each of the first and second linkages comprises:
   a steering linkage having a first end pivotably connected to the respective handlebar, and a second end opposite to the first end;
   a steering pivot arm which is pivotably connected to the second end of the steering linkage at a first pivot point;
   a tie rod having opposite first and second ends, the steering pivot arm being pivotably connected to the first end of the tie rod at a second pivot point; and
   a steering arm having a first end pivotably connected to the second end of the tie rod, and a second end opposite to the first end and fixedly connected to the respective wheel unit,
   wherein the steering pivot arms of the first and second linkages are pivotably connected to the structural frame at a common third pivot point so that the steering pivot arms are pivotable relatively to each other about the third pivot point.

3. The vehicle of claim 2, wherein the first, second and third pivot points of each steering pivot arm form points of a triangle.

4. The vehicle of claim 2, wherein the movement coordinator comprises a spring attached to each of the steering pivot arms of the first and second linkages at a location away from the third pivot point thereof so that pivotable movement of one of the steering pivot arms in an outward direction causes the other of the steering pivot arms to follow in the same direction.

5. The vehicle of claim 2, wherein the first wheels are front wheels and the second wheels are rear wheels.

6. The vehicle of claim 5, further comprising a bumper disposed forward of the first wheels and supported by the structural frame.

7. The vehicle of claim 1, wherein pivotable movement of the first and the second handlebars in opposite directions is resisted by at least one of a spring and an elastic member such that application of an amount of pivotal force on the first and the second handlebars in opposite directions is required to overcome the resistance of the at least one of the spring and the elastic member to cause the toe-in braking action.

8. A vehicle comprising:
a structural frame;
a rider support platform supported by the structural frame;
a pair of first wheel units pivotably supported by the structural frame, each first wheel unit comprising a first wheel;
a pair of second wheel units supported by the structural frame, each second wheel unit comprising a second wheel;
a first handlebar pivotably supported by the structural frame so that the first handlebar is pivotable relatively to the structural frame in opposite first and second directions;
a second handlebar pivotably supported by the structural frame so that the second handlebar is also pivotable relatively to the structural frame in the first and second directions;
a first linkage connecting the first handlebar to one of the first wheel units so that pivotable movement of the first handlebar causes the first wheel of the one of the first wheel units to turn relatively to the structural frame;
a second linkage connecting the second handlebar to the other of the first wheel units so that pivotable movement of the second handlebar causes the first wheel of the other of the first wheel units to turn relatively to the structural frame; and
a movement coordinator which connects the first and second linkages to each other so that pivotable movement of one or both of the first and second handlebars in the first or second direction causes the first wheels to turn in the same direction, wherein the structural frame comprises a first sub-structural frame pivotably supporting the first wheel units and the first and second handlebars, and a second sub-structural frame supporting the second wheel units, the rider support platform comprising a first sub-rider-support platform supported by the first sub-structural frame, and a second sub-rider-support platform supported by the second sub-structural frame, the second sub-rider-support platform being pivotably connected to the first sub-rider-support platform for folding the vehicle.

9. The vehicle of claim 8, wherein the second sub-rider-support platform is pivotably connected to the first sub-rider-support platform by a hinge.

10. The vehicle of claim 8, wherein the second sub-structural frame is releasably connected to the first sub-structural frame.

11. The vehicle of claim 10, wherein the second sub-structural frame is releasably connected to the first sub-structural frame by a connector which comprises a frame support bracket fixedly attached to one of the first and second sub-structural frames and having a through hole, a complementary through hole in the other of the first and second sub-structural frames, and a lock pin received in said holes.

12. The vehicle of claim 11, wherein the frame support bracket is fixedly attached to the first sub-structural frame and extends outward therefrom, and the complementary through hole is formed in the second sub-structural frame.

13. The vehicle of claim 11, wherein the lock pin comprises a ball-lock pin or a bolt and a nut.

14. The vehicle of claim 1, wherein each of the first and second wheel units comprises a spindle bracket pivotably supported by the structural frame and having holes of different heights, and an axle having a first end rotatably attached to the respective wheel and a second end non-rotatably placed in one of the holes of the spindle bracket.

15. The vehicle of claim 14, wherein placing the second end of said axle from the one of the holes of the spindle bracket to another of the holes of the spindle bracket changes a height of the rider support platform relative to the respective wheel.

16. The vehicle of claim 14, wherein said axle is threaded, and each of said holes is also threaded.

17. The vehicle of claim 14, wherein a handle is attached to the first end of said axle.

18. A vehicle comprising:
a structural frame comprising a front sub-structural frame and a rear sub-structural frame;
a rider support platform comprising a front sub-rider-support platform supported by the front sub-structural frame, and a rear sub-rider-support platform supported by the rear sub-structural frame and pivotably connected to the front sub-rider-support platform;
a pair of front wheel units, each front wheel unit comprising a front wheel, a spindle bracket pivotably supported by the front sub-structural frame and having holes of different heights, and an axle having a first end rotatably attached to the front wheel and a second end non-rotatably received in one of the holes of the spindle bracket;
a pair of rear wheel units supported by the rear sub-structural frame, each rear wheel unit comprising a rear wheel;
a first handlebar pivotably supported by the front sub-structural frame so that the first handlebar is pivotable relatively to the front sub-structural frame in opposite first and second directions;
a second handlebar pivotably supported by the front sub-structural frame so that the second handlebar is also pivotable relatively to the front sub-structural frame in the first and second directions;
a first linkage connecting the first handlebar to the spindle bracket of one of the front wheel units so that pivotable movement of the first handlebar causes the front wheel of the one of the front wheel units to turn relatively to the front sub-structural frame;
a second linkage connecting the second handlebar to the spindle bracket of the other of the front wheel units so that pivotable movement of the second handlebar causes the front wheel of the other of the front wheel units to turn relatively to the front sub-structural frame; and
a movement coordinator which connects the first and second linkages to each other so that pivotable movement of one or both of the first and second handlebars in the first or second direction causes the front wheels to turn in the same direction.

* * * * *